(12) United States Patent
Jeon et al.

(10) Patent No.: US 11,653,099 B2
(45) Date of Patent: May 16, 2023

(54) APPARATUS AND METHOD WITH IMAGING RECONSTRUCTION

(71) Applicant: RESEARCH & BUSINESS FOUNDATION SUNGKYUNKWAN UNIVERSITY, Suwon-si (KR)

(72) Inventors: Byeung Woo Jeon, Seongnam-si (KR); Jae Lin Lee, Suwon-si (KR); Gyo Heak Oh, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 110 days.

(21) Appl. No.: 17/478,285

(22) Filed: Sep. 17, 2021

(65) Prior Publication Data
US 2022/0086324 A1    Mar. 17, 2022

(30) Foreign Application Priority Data
Sep. 17, 2020    (KR) .......................... 10-2020-0119895

(51) Int. Cl.
| | |
|---|---|
| *H04N 23/72* | (2023.01) |
| *G06T 5/50* | (2006.01) |
| *G06T 7/194* | (2017.01) |
| *H04N 23/71* | (2023.01) |
| *H04N 23/74* | (2023.01) |

(52) U.S. Cl.
CPC .............. *H04N 23/72* (2023.01); *G06T 5/50* (2013.01); *G06T 7/194* (2017.01); *H04N 23/71* (2023.01); *H04N 23/74* (2023.01); *G06T 2207/20212* (2013.01)

(58) Field of Classification Search
None
See application file for complete search history.

(56) References Cited

U.S. PATENT DOCUMENTS

| | | | |
|---|---|---|---|
| 2007/0201853 A1* | 8/2007 | Petschnigg | ............ H04N 23/88 348/E5.038 |
| 2009/0040335 A1* | 2/2009 | Ito | .......................... H04N 23/88 348/E9.051 |
| 2009/0285573 A1* | 11/2009 | Aoyagi | .................. G03B 15/03 396/157 |

FOREIGN PATENT DOCUMENTS

| | | |
|---|---|---|
| JP | 2005-114435 A | 4/2005 |
| JP | 2012-244357 A | 12/2012 |

(Continued)

OTHER PUBLICATIONS

Korean Office Action dated May 7, 2021 in counterpart Korean Patent Application No. 10-2020-0119895 (5 pages in Korean).
(Continued)

*Primary Examiner* — Quan Pham
(74) *Attorney, Agent, or Firm* — NSIP Law (57) ABSTRACT

A processor-implemented method with image reconstruction includes: acquiring information indicating an amount of ambient light in accordance with a shutter exposure time of a camera; generating an ambient light pattern based on the information about the amount of ambient light; generating a compensation pattern which compensates for a invertibility of an external illumination pattern based on the ambient light pattern; controlling an operation of an external illumination based on the compensation pattern to acquire a photographed image by a camera; and reconstructing a latent image of the photographed image in the acquired photographed image based on the compensation pattern.

14 Claims, 5 Drawing Sheets

(56) References Cited

FOREIGN PATENT DOCUMENTS

| KR | 10-2007-0098315 A | 4/2009 |
| KR | 10-2009-0032807 A | 4/2009 |
| KR | 10-1229376 B1 | 2/2013 |
| KR | 10-12293760000 B1 | 2/2013 |
| KR | 10-2013-0075957 A | 7/2013 |

OTHER PUBLICATIONS

Korean Office Action dated Nov. 26, 2021 in counterpart Korean Patent Application No. 10-2020-0119895 (3 pages in Korean).

* cited by examiner

APPARATUS AND METHOD WITH IMAGING RECONSTRUCTION

CROSS-REFERENCE TO RELATED APPLICATIONS

This application claims the benefit under 35 USC § 119(a) of Korean Patent Application No. 10-2020-0119895 filed on Sep. 17, 2020, in the Korean Intellectual Property Office, the entire disclosure of which is incorporated herein by reference for all purposes.

BACKGROUND

1. Field

The following description relates to an apparatus and method with image reconstruction.

2. Description of the Related Art

In computational photography, there may be three methods for acquiring a clear image as if it is photographed by a high speed camera using a general camera. A first method (1) may use a high speed camera, a second method (2) may acquire an image with a general camera by adjusting an operation pattern of a shutter, and a third method (3) may acquire an image with a general camera by adjusting an operation pattern of an external illumination.

The first method and the second method may be image acquiring methods based on a shutter. According to the first method, a quality of the acquired image may be improved in proportion to the camera price and a significantly expensive device may be required to acquire a clear image of a moving object. According to the second method, a clear image of a region of interest may be acquired by the method of controlling a shutter with an appropriate cost as compared with the first method, but it may be difficult to implement the hardware. Further, for the second method, since of an amount of light acquired by the camera is reduced by the operation of the shutter, the acquired image may be dark and the method may be difficult to implement in a low illuminance environment. According to the third method, the amount of light of the acquired image may be adjusted by adjusting the amount of light of the used illumination so that the third method is effective in the low illuminance environment. However, the third method may not consider an environment in which ambient light cannot be controlled by the user, and therefore there may be a degradation of the image quality due to an external illumination.

For example, there may be a problem of the third method in that when there is an unexpected illumination outside, an image quality of the reconstructed image may be degraded. When there is an unexpected ambient light component in addition to an illumination which can be directly controlled, in an environment in which the image is acquired, an unknown pattern may be added to a pattern which operates the external illumination so that a invertibility of an illumination operation pattern optimized by the third method cannot be ensured. This is because a pattern for controlling the illumination used to acquire images may be optimized without considering an environment for photographing. In this case, there may be a problem in that an image reconstruction performance in an actual environment is degraded more than a reconstruction performance predicted by a simulation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with image reconstruction includes: acquiring information indicating an amount of ambient light in accordance with a shutter exposure time of a camera; generating an ambient light pattern based on the information about the amount of ambient light; generating a compensation pattern which compensates for a invertibility of an external illumination pattern based on the ambient light pattern; controlling an operation of an external illumination based on the compensation pattern to acquire a photographed image by a camera; and reconstructing a latent image of the photographed image in the acquired photographed image based on the compensation pattern.

The generating of the compensation pattern may include generating a compensation pattern corresponding to each color filter of the camera.

The generating of the compensation pattern may include generating, by a joint point spread function being generated in the photographed image based on the compensation pattern, a compensation pattern in which a dispersion of a frequency domain function of the point spread function of the joint is small and a minimum value of a signal is large.

The controlling of the operation of the external illumination to acquire the photographed image by the camera may include applying the compensation pattern corresponding to different light sources of the external illumination to control the operation of the external illumination.

The controlling of the operation of the external illumination to acquire the photographed image by the camera may include synchronizing a shutter exposure timing of the camera and a timing to apply the compensation pattern of the external illumination.

The reconstructing of the photographed image may include: acquiring a background image photographed before a dynamic object appears; acquiring an image in which the dynamic object appears, by a camera which is synchronized with the external illumination to which the compensation pattern is applied; separating a dynamic object and a background from an image in which the dynamic object appears; reconstructing the separated dynamic object using the compensation pattern; and composing the reconstructed dynamic object with the background image.

In another general aspect, one or more embodiments include a non-transitory computer-readable storage medium storing instructions that, when executed by a processor, configure the processor to perform any one, any combination, or all operations and methods described herein.

In another general aspect, an apparatus with image reconstruction includes: one or more processors configured to: acquire information about an amount of ambient light in accordance with a shutter exposure time of a camera; generate an ambient light pattern based on the information about an amount of ambient light; generate a compensation pattern which compensates for a invertibility of an external illumination pattern based on the ambient light pattern; control an operation of an external illumination and the camera to acquire a photographed image; and reconstruct a latent image of the photographed image in the acquired photographed image based on the compensation pattern.

For the generating of the compensation pattern, the one or more processors may be configured to generate a compensation pattern corresponding to each color filter of the camera.

For the generating of the compensation pattern, the one or more processors may be configured to generate, by a joint point spread function being generated in the photographed image based on the compensation pattern, a compensation pattern in which a dispersion of a frequency domain function of the point spread function of the joint is small and a minimum value of a signal is large.

For the controlling of the operation of the external illumination, the one or more processors may be configured to apply the compensation pattern corresponding to different light sources of the external illumination to control the operation of the external illumination.

For the controlling of the operation of the external illumination, the one or more processors may be configured to synchronize a shutter exposure timing of the camera and a timing to apply the compensation pattern of the external illumination.

For the reconstructing of the photographed image, the one or more processors may be configured to: acquire a background image photographed before a dynamic object appears; acquire an image in which the dynamic object appears by a camera synchronized with the external illumination to which the compensation pattern is applied; separate a dynamic object and a background from an image in which the dynamic object appears; and reconstruct the separated dynamic object based on the compensation pattern to be composed with the background image.

The apparatus may include: the camera; the external illumination comprising one or more light sources; and a sensor comprising either one or both of an actinometer and a spectrometer, and configured to generate the information about the amount of ambient light.

In another general aspect, a processor-implemented method with image reconstruction includes: generating an ambient light pattern based on information indicating an amount of ambient light generated based on a shutter exposure time of a camera; generating a compensation pattern which compensates for a invertibility of an external illumination pattern based on the ambient light pattern; and reconstructing a latent image of an image acquired using the camera, based on the compensation pattern.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience

DETAILED DESCRIPTION OF THE PREFERRED EMBODIMENT

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, examples will be described in detail with reference to the accompanying drawings. When describing the examples with reference to the accompanying drawings, like reference numerals refer to like components and a repeated description related thereto will be omitted.

Figure 1:
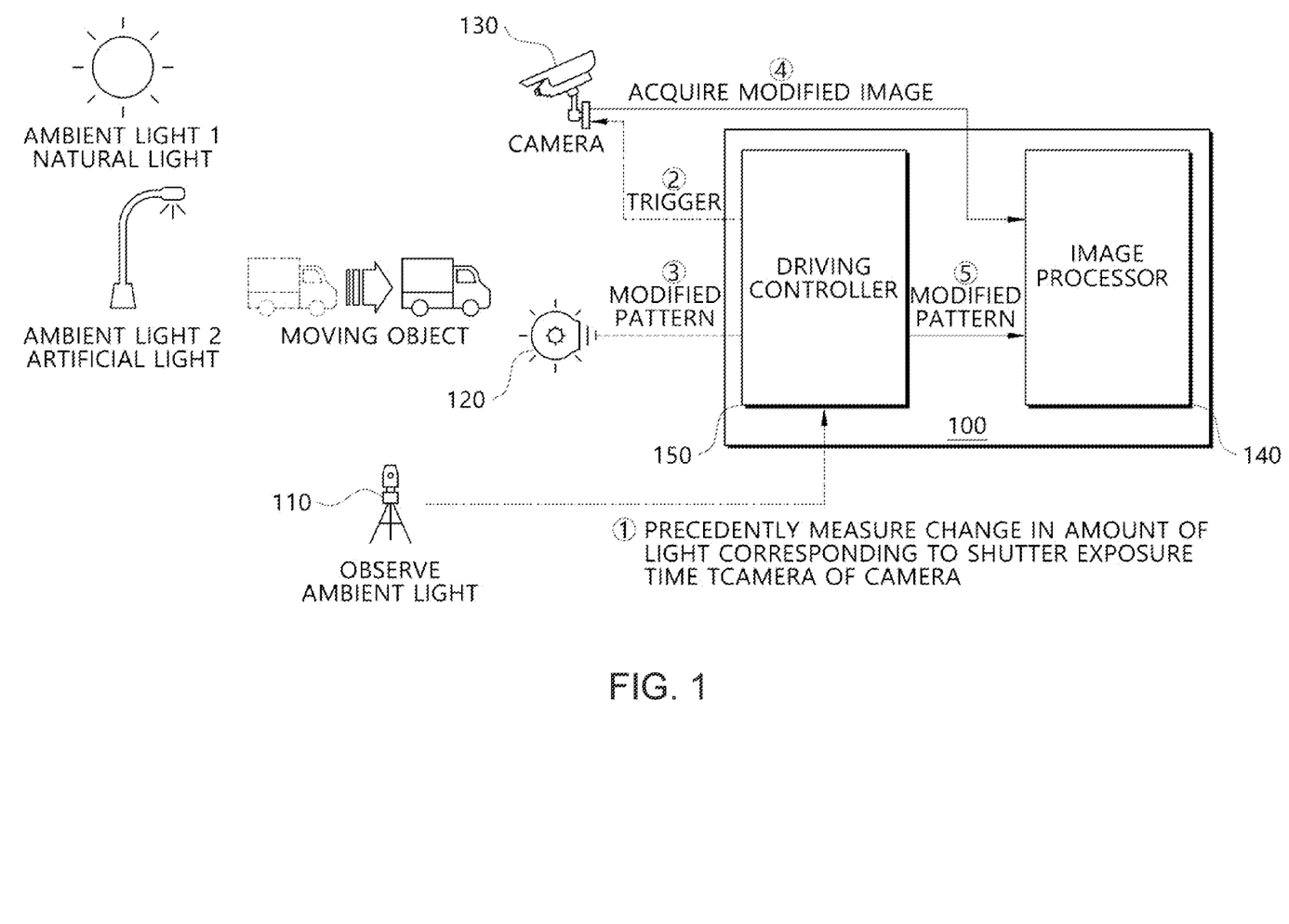
FIG. 1 is a view for explaining an operation of an image reconstructing apparatus according to one or more embodiments.
Figure 2:
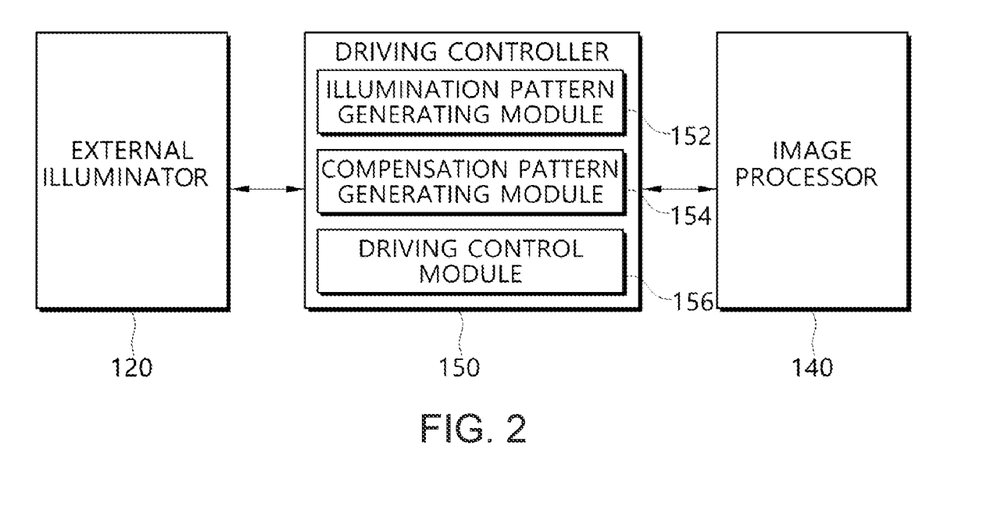
FIG. 2 is a block diagram illustrating a configuration of an image reconstructing apparatus according to one or more embodiments.
Figure 3:
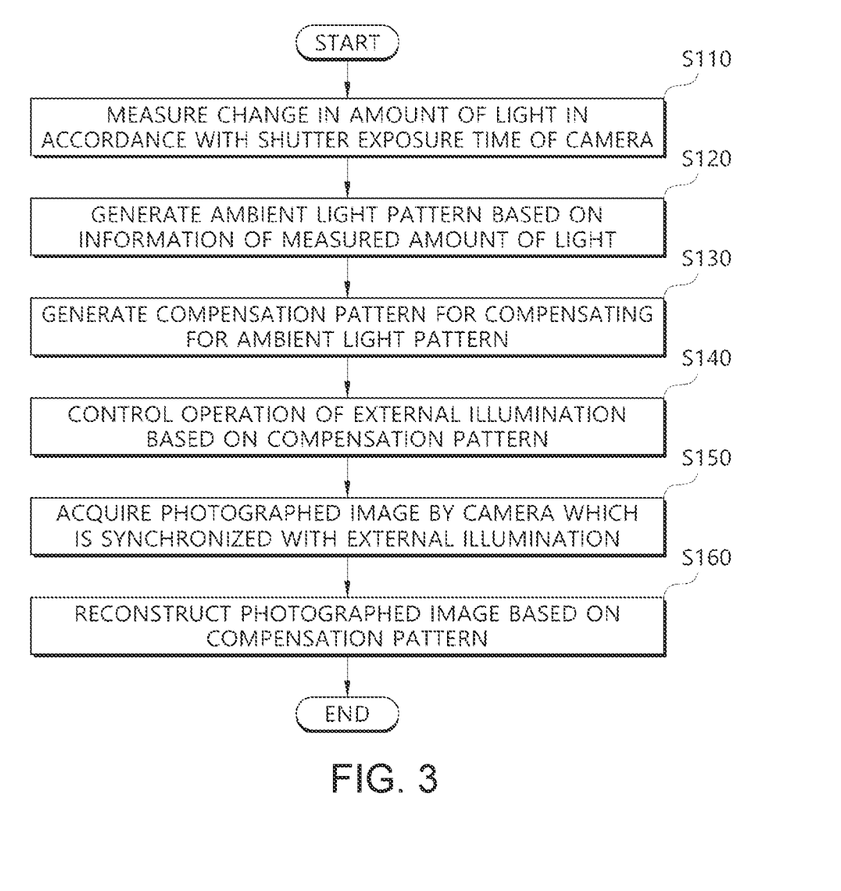
FIG. 3 is a flowchart for explaining an image reconstructing method according to one or more embodiments.

FIG. 1 is a view for explaining an operation of an image reconstructing apparatus according to one or more embodiments. FIG. 2 is a block diagram illustrating a configuration of an image reconstructing apparatus according to one or more embodiments. FIG. 3 is a flowchart for explaining an image reconstructing method according to one or more embodiments.

The image reconstructing apparatus 100 may be an apparatus which photographs a moving dynamic object and reconstructs the photographed image to be clear. Therefore, as shown in FIG. 1, the image reconstructing apparatus 100 may include a camera 130 which photographs a dynamic object, an external illuminator 120 (e.g., including a light source such as one or more incandescent light bulbs or light-emitting diodes) which illuminates an angle of view of the camera 130, an ambient light measurer 110 (e.g., a sensor including one or more light sensors, actinometers, and/or spectrometers) which observes ambient light of the angle of view, an image processor 140 (e.g., one or more processors) which reconstructs the image photographed by the camera 130, and a driving controller 150 (e.g., one or more processors) which controls the external illuminator 120 and the camera 130. In a non-limiting example, a processor of the image reconstructing apparatus 100 includes the image processor 140 and the driving controller 150.

The number m of used external illuminations may be determined by a type of a color filter array (CFA) of the camera 130. When the number of types of the CFA of the camera 130 is L, an external illumination (e.g., the external illuminator 120) which includes a light source having a wavelength corresponding to each color filter of the camera 130 is employed.

That is, when the camera 130 uses a Bayer-pattern CFA, an image having three channels R, G, B may be acquired for one sheet so that an external illumination having three light sources is necessary. Further, when the camera 130 uses a near infrared filter (mono-NIR CFA), an image having two channels of monochrome and near infrared (NIR) is acquired in one image. In this case, an external illumination having two light sources may be used.

Thereafter, a compensation pattern may be applied to multi-channel of a multi-frame. When a number of frames used for the compensation is C, the number of compensation patterns is M≤C×L. For example, when five frames are used and the number of photo sensors of the camera is four (L=4), M≤C×L=20.

According to an exemplary embodiment, the driving controller 150 may control an external illumination to minimize noises caused by ambient light in an image photographed by the camera 130.

To this end, as shown in FIG. 2, the driving controller 150 may include an illumination pattern generating module 152 which analyzes the ambient light observed by the ambient light measurer 110 to generate an illumination pattern, a compensation pattern generating module 154 which generates a compensation pattern for controlling the external illuminator 120 to compensate for degradation due to the ambient light, and a driving control module 156 which irradiates light of the external illuminator 120 applied with the compensation pattern and synchronizes the camera 130 with the irradiating of the external illuminator 120 to control the photographing.

The image processor 140 may acquire an image photographed by the camera 130 which is synchronized with the external illuminator 120 (that is, a photographed image to which the compensation pattern is applied) to reconstruct the image.

Here, the external illuminator 120 may be a high speed illumination which is controlled by the image reconstructing apparatus 100.

In step S110 of FIG. 3, the ambient light measurer 110 may measure a change in an amount of light in accordance with a shutter exposure time of a camera to photograph.

For example, the ambient light measurer 110 may measure the change in the amount of light in accordance with the shutter exposure time of the camera to photograph using a sensor of the ambient light measurer 110 such as an actinometer or a spectrometer. Alternatively, the ambient light measurer 110 may analyze and identify the image acquired by the camera 130.

Here, the ambient light may include natural light and/or artificial light (which may not be controlled by a user). The artificial light may refer to light which is irradiated by an artificial illumination which is not controlled by the user (e.g., light that is not light irradiated by the external illuminator 120).

In step S120 of FIG. 3, the ambient light pattern generating module 142 of the driving controller 140 may generate an ambient light pattern based on information of an amount of light of the ambient light acquired by the ambient light measurer 110.

The ambient light pattern generating module 142 may calculate and normalize a ratio r of a maximum value of brightness of the external light with respect to a maximum value of a brightness of the ambient light as expressed in Equation 1 below, for example.

$$r_{max} = \text{(Brightness of external illumination)}_{max} / \text{(Brightness of ambient light)}_{max}$$ Equation 1:

Here, the external light may be light irradiated by the external illuminator 120.

In step S130 of FIG. 3, a compensation pattern generating module 144 of the driving controller 140 may generate a compensation pattern which compensates for the ambient light pattern.

Figure 5:
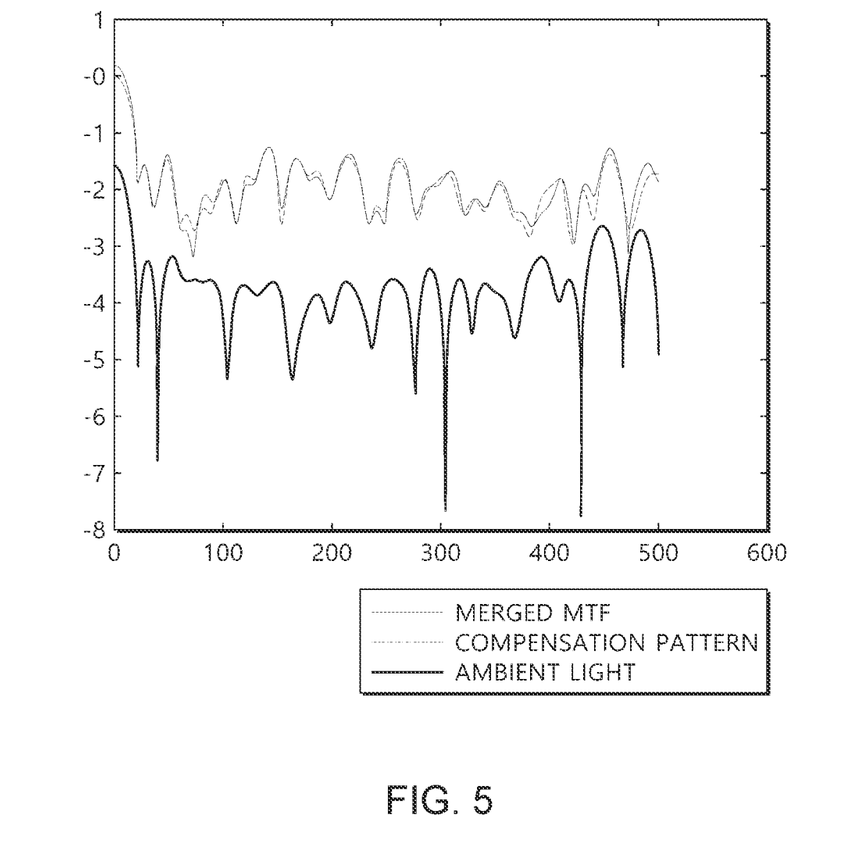
FIG. 5 is a graph illustrating a modulated transfer function (MTF) of an ambient light pattern and a compensation pattern according to one or more embodiments.

When a merged pattern is generated by reflecting the normalized ambient light pattern and the compensation pattern, a compensation pattern in which a dispersion of a frequency domain function of a point spread function of a joint blur is small and a minimum value of a signal is large may be generated. As illustrated in FIG. 5, the invertibility of the compensation pattern having a low dispersion and a large minimum value of the signal may be reduced by arbitrary ambient light. The brightness of the ambient light generated in accordance with the ambient light pattern Q may be 0.2 times. When the brightness of the ambient light is increased, the invertibility may not be further ensured.

As the invertibility is reduced, the noise of the reconstructed image may be amplified. Therefore, after patterning the pattern of the ambient light through the observation, when patterns (compensation patterns) which compensates therefor are generated to control the external illumination, the noise may be minimized.

For example, the merged pattern may be generated by calculating a coded factor where the coded factor is a value which minimizes a sum of dispersions of a modulated transfer function (MTF) of the merged pattern. Such a merged pattern may be expressed by the following Equation 2, for example.

$$\operatorname*{argmin}_{P,Q} \frac{1}{2} \int_{-\pi}^{\pi} \left[ \sum_{j=1}^{L} |\mathcal{F}(P_j + Q_j)|^2 - Ln \right]^2 \quad \text{Equation 2}$$

L compensation patterns may be generated by Equation 2. Compensation patterns $\Omega_{coded}$ which compensate for L observed ambient light patterns may be generated. Here, L is the number of observed ambient light patterns and the number of compensation patterns is equal to the number of ambient light patterns.

In the meantime, a sequence of the ambient light may be $Q=[q_1, q_2, \ldots, q_n]$, a set of ambient light may be $\Omega_{amb}=[Q_1 \ldots, Q_m]$, a sequence of the external illuminations may be $P=[p_1, p_2, \ldots, p_n]$, and the compensation pattern may be $\Omega_{coded}=[P_1, \ldots, P_m]$.

When the sequence of the ambient light is $Q=[q_1, q_2, \ldots, q_n]$, and similarly, the compensation pattern $\Omega_{coded}$ is determined by Equation 2 in accordance with the pattern $\Omega_{amb}$ of the ambient light and an amount $\Sigma_j{}^m \Sigma_i{}^n q_i^j$ of ambient light, a value r may be calculated by the determined amount $\Sigma_j{}^m \Sigma_i{}^n q_i^j$ of light of external illumination.

In step S140 of FIG. 3, the driving controller 150 may control an operation of the external illuminator 120 based on the compensation pattern and in step S150 of FIG. 3, the image processor 160 may acquire an image by the camera 130 which is synchronized with the external illuminator 120 based on the compensation pattern.

The driving controller 150 may synchronize the external illuminator 120 with the camera 130 before controlling the external illumination. As the camera 130 may acquire light only for a shutter exposure time, an operation time of the external illumination may match the shutter exposure time of the camera. Accordingly, the driving controller 150 may match a trigger signal which operates the camera and $\Omega_{coded}$ of the external illuminator 120.

The external illuminator 120 and the camera 130 may operate by the synchronized trigger signal and the synchronized $\Omega_{coded}$ to acquire an image. The image acquired as described above may be an image in which the compensation pattern compensating for the illumination pattern is reflected.

In step S160 of FIG. 3, the image processor 160 may reconstruct the image by reflecting the compensation pattern in the acquired image.

The compensation pattern P is a binary pattern which controls the illumination and the pattern used to reconstruct the acquired image may be reconstructed by B below, for example.

$$B_i = \frac{r p_k + (1-r) q_k}{\sum_{k=1}^{n} r p_k + (1-r) q_k}$$

$B_i$ is a compensation pattern value of an i-th channel in which a motion blur coded by $P_i$ and $Q_i$ is generated.

A non-limiting example of the image reconstructing process will be described below in more detail with reference to FIG. 4.

Figure 4:
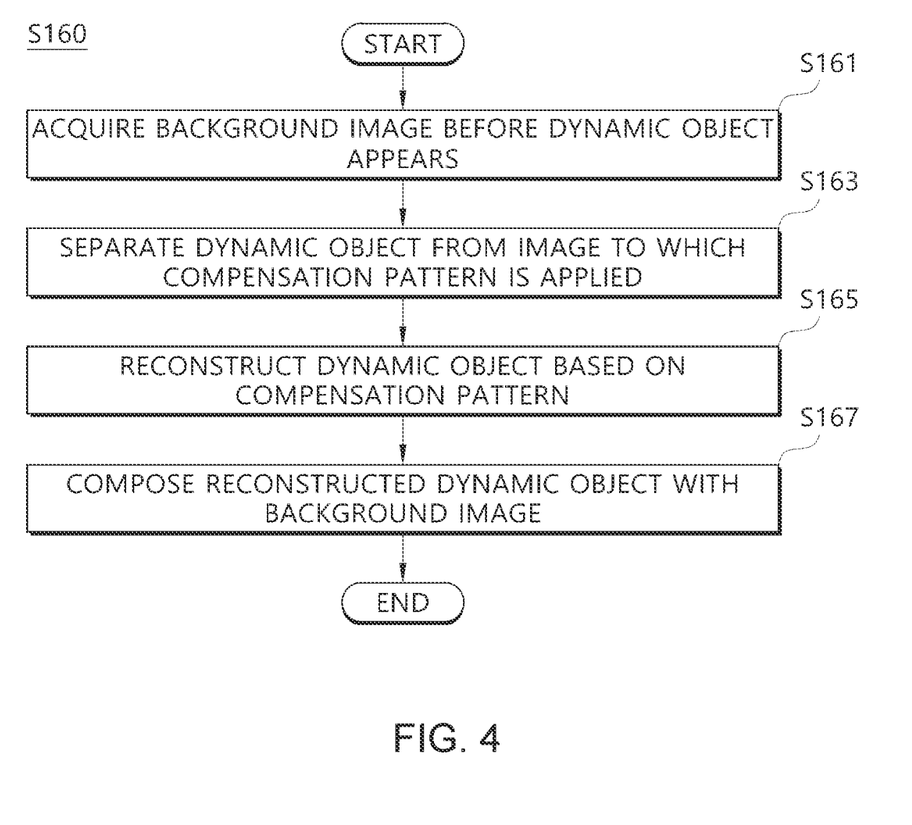
FIG. 4 is a flowchart for explaining an image reconstructing method according to one or more embodiments.

FIG. 4 is a flowchart for explaining an image reconstructing method according to one or more embodiments.

In step S161, a background image photographed before a dynamic object appears may be acquired.

The image processor may acquire a clear background image before the compensation pattern is reflected (that is, before the dynamic object appears).

In step S163, an image in which the dynamic object appears may be acquired by the camera synchronized with the external illumination to which the compensation pattern is applied and a foreground (a dynamic object) and the background may be separated from the acquired image. The image in which the dynamic object appears may be acquired by a camera which is synchronized with the operation of the external illumination to which the compensation pattern is applied.

In step S165, the dynamic object may be reconstructed in the separated foreground image.

A motion blur image may be expressed as follows, for example.

$$y = h*x + n$$

Here, y is a motion-blurred acquired image, h is a motion blur kernel which is a point spread function, x is a clear image, and n is a noise. When the influence of n is insignificant, the reconstructed clear image may be expressed as follows, for example.

$$\hat{x} = A^\dagger y$$

Here, A is a circulant matrix of h and $A^+$ is a pseudo inverse.

$P_j + Q_j$ (for j=1, . . . , m) of Equation 2 expressed by P and Q generated according to the exemplary embodiment of the present disclosure corresponds to h of Equation 3 and thus an image $\hat{x}$ which is reconstructed by the acquired image y may be expressed by the following Equation, for example.

$$\hat{x}_L = A_L^\dagger y_L$$

Here, L is an index indicating each channel of the used camera image.

In step S167, the reconstructed foreground image is composed with the background image.

The foreground image reconstructed in step S165 may be composed with the background image acquired in step S161.

FIG. 5 is a graph illustrating a modulated transfer function (MTF) of an ambient light pattern and a compensation pattern according to one or more embodiments.

The graph represents MTF in which the ambient light pattern Q and the compensation pattern P are merged. In FIG. 5, a y-axis is MTF and an x-axis is a spatial frequency.

In FIG. 5, operation patterns of the external illumination which compensate for an ambient light sequence set $\Omega_{amb}$ are generated. When the compensation pattern P is a binary pattern selected to have a good invertibility, an MTF value calculated by converting the corrected pattern into a frequency by discrete Fourier transform (DFT) is represented.

As seen from FIG. 5, the ambient light pattern Q has a null space, but an orange color solid line which reflects the compensation pattern does not have a null space. However, a common invertible blur generated when the ambient light affects the invertibility of the photographed image, that is, when the ambient light pattern is reflected has a reduced invertibility as represented in the graph with a bold line.

Figure 6:
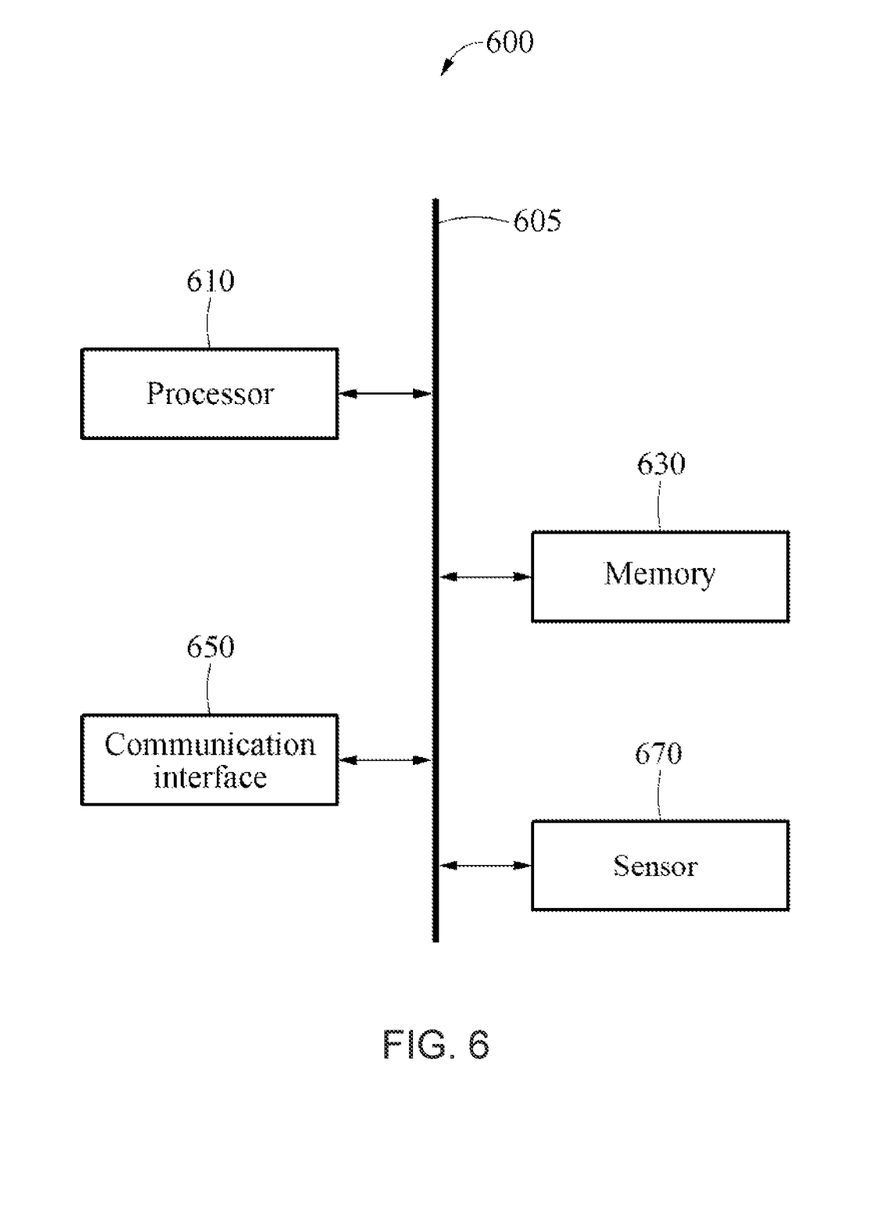
FIG. 6 illustrates an example of an electronic apparatus according to one or more embodiments.

FIG. 6 illustrates an example of an electronic apparatus.

Referring to FIG. 6, an electronic apparatus 600 may photograph a moving dynamic object and reconstruct the photographed image to be clear. The electronic apparatus 600 may be or include an image reconstructing apparatus described herein (for example, the image reconstructing apparatus 100 of FIG. 1 and/or FIG. 2), as non-limiting examples.

The electronic apparatus 600 may be a computing device, an image acquisition device, or a display device. The electronic apparatus 600 may be, for example, a personal computer (PC), an advanced driver assistance system (ADAS), a head-up display (HUD) device, a camera, a 3D digital information display (DID), a navigation device, a neuromorphic device, a 3D mobile device, a smartphone, a smart television (TV), a smart vehicle, an internet of things (IoT) device, a medical device, or the like. The 3D mobile device may include, for example, a display device configured to display AR, virtual reality (VR), and/or mixed reality (MR), a head-mounted display (HMD), a face-mounted display (FMD), and AR glasses.

The electronic apparatus 600 may include a processor 610 (e.g., one or more processors), a memory 630 (e.g., one or more memories), a sensor 670 (e.g., one or more sensors), and a communication interface 650. These components of the electronic apparatus 600 may communicate with one another through a communication bus 605.

The processor 610 may control an overall operation of the electronic apparatus 600 and implement operations or methods by execution of instructions stored in the memory 630. The processor 610 may include the image processor 140 and the driving controller 150 described above, as a non-limiting example. The processor 610 may be configured to perform one or more or all steps, operations, or methods described above with reference to FIGS. 1 through 5. In an example, the processor 610 may reconstruct an image by reflecting a compensation pattern in an acquired image.

The memory 630 may store information used by the processor 610 to perform operations. For example, the memory 630 may store instructions, which when executed by the processor 610, configure the processor to perform one or more or all steps, operations, or methods described above with reference to FIGS. 1 through 5, as well as related information for the execution of other functions or other applications of the electronic apparatus 600. The memory 630 may include, as a memory, an RAM, a DRAM, an SRAM, and other types of nonvolatile memory that are known in the related technical field. In addition, the memory 630 may be a computer-readable storage medium or device, such as, for example, a storage, a magnetic hard disk, an optical disc, a flash memory device, and the like.

The sensor 670 may include the ambient light measurer 110 and the camera 130 of FIG. 1 and/or FIG. 2, in an example.

The communication interface 650 may communicate externally. The communication interface 650 may include the illuminator 120 of FIG. 1 and/or FIG. 2, in an example. The interface 650 may further output any or all results generated by the processor 610 through, e.g., a display or interface of the interface 650.

The image reconstructing apparatuses, light measurers, external illuminators, cameras, image processors, driving controllers, electronic apparatuses, processors, memories, sensors, communication interfaces, image reconstructing apparatus 100, light measurer 110, external illuminator 120, camera 130, image processor 140, driving controller 150, electronic apparatus 600, processor 610, memory 630, sensor 670, communication interface 650, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with image reconstruction, comprising:
    acquiring information indicating an amount of ambient light in accordance with a shutter exposure time of a camera;
    generating an ambient light pattern based on the information about the amount of ambient light;
    generating a compensation pattern which compensates for a invertibility of an external illumination pattern based on the ambient light pattern;
    controlling an operation of an external illumination based on the compensation pattern to acquire a photographed image by a camera; and
    reconstructing a latent image of the photographed image in the acquired photographed image based on the compensation pattern.

2. The method of claim 1, wherein the generating of the compensation pattern comprises generating a compensation pattern corresponding to each color filter of the camera.

3. The method of claim 1, wherein the generating of the compensation pattern comprises generating, by a joint point spread function being generated in the photographed image based on the compensation pattern, a compensation pattern in which a dispersion of a frequency domain function of the point spread function of the joint is small and a minimum value of a signal is large.

4. The method of claim 1, wherein the controlling of the operation of the external illumination to acquire the photographed image by the camera comprises applying the compensation pattern corresponding to different light sources of the external illumination to control the operation of the external illumination.

5. The method of claim 1, wherein the controlling of the operation of the external illumination to acquire the photographed image by the camera comprises synchronizing a shutter exposure timing of the camera and a timing to apply the compensation pattern of the external illumination.

6. The method of claim 1, wherein the reconstructing of the photographed image comprises:
    acquiring a background image photographed before a dynamic object appears;
    acquiring an image in which the dynamic object appears, by a camera which is synchronized with the external illumination to which the compensation pattern is applied;
    separating a dynamic object and a background from an image in which the dynamic object appears;
    reconstructing the separated dynamic object using the compensation pattern; and
    composing the reconstructed dynamic object with the background image.

7. A non-transitory computer-readable storage medium storing instructions that, when executed by one or more processors, configure the one or more processors to perform the method of claim 1.

8. An apparatus with image reconstruction, comprising:
one or more processors configured to:
- acquire information about an amount of ambient light in accordance with a shutter exposure time of a camera;
- generate an ambient light pattern based on the information about an amount of ambient light;
- generate a compensation pattern which compensates for a invertibility of an external illumination pattern based on the ambient light pattern;
- control an operation of an external illumination and the camera based on the compensation pattern to acquire a photographed image; and
- reconstruct a latent image of the photographed image in the acquired photographed image based on the compensation pattern.

9. The apparatus of claim 8, wherein, for the generating of the compensation pattern, the one or more processors are configured to generate a compensation pattern corresponding to each color filter of the camera.

10. The apparatus of claim 8, wherein, for the generating of the compensation pattern, the one or more processors are configured to generate, by a joint point spread function being generated in the photographed image based on the compensation pattern, a compensation pattern in which a dispersion of a frequency domain function of the point spread function of the joint is small and a minimum value of a signal is large.

11. The apparatus of claim 8, wherein, for the controlling of the operation of the external illumination, the one or more processors are configured to apply the compensation pattern corresponding to different light sources of the external illumination to control the operation of the external illumination.

12. The apparatus of claim 8, wherein, for the controlling of the operation of the external illumination, the one or more processors are configured to synchronize a shutter exposure timing of the camera and a timing to apply the compensation pattern of the external illumination.

13. The apparatus of claim 8, wherein, for the reconstructing of the photographed image, the one or more processors are configured to:
- acquire a background image photographed before a dynamic object appears;
- acquire an image in which the dynamic object appears by a camera synchronized with the external illumination to which the compensation pattern is applied;
- separate a dynamic object and a background from an image in which the dynamic object appears; and
- reconstruct the separated dynamic object based on the compensation pattern to be composed with the background image.

14. The apparatus of claim 8, further comprising:
the camera;
the external illumination comprising one or more light sources; and
a sensor comprising either one or both of an actinometer and a spectrometer, and configured to generate the information about the amount of ambient light.

* * * * *